US012572974B2

(12) United States Patent (10) Patent No.: US 12,572,974 B2
Asthana et al. (45) Date of Patent: Mar. 10, 2026

(54) AUTOMATIC PROCESSING AND MATCHING OF INVOICES TO PURCHASE ORDERS

(71) Applicant: INTERNATIONAL BUSINESS MACHINES CORPORATION, Armonk, NY (US)

(72) Inventors: Shubhi Asthana, Santa Clara, CA (US); Bing Zhang, San Jose, CA (US); Pawan Raghunath Chowdhary, San Jose, CA (US); Taiga Nakamura, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 18/061,108

(22) Filed: Dec. 2, 2022

(65) Prior Publication Data

US 2024/0185326 A1 Jun. 6, 2024

(51) Int. Cl.
| | |
|---|---|
| *G06Q 30/00* | (2023.01) |
| *G06F 40/20* | (2020.01) |
| *G06N 3/045* | (2023.01) |
| *G06Q 30/0601* | (2023.01) |

(52) U.S. Cl.
CPC ......... *G06Q 30/0635* (2013.01); *G06F 40/20* (2020.01); *G06N 3/045* (2023.01)

(58) Field of Classification Search
CPC ..... G06Q 30/0635; G06F 40/20; G06N 3/045
See application file for complete search history.

(56) References Cited

U.S. PATENT DOCUMENTS

| | | | |
|---|---|---|---|
| 10,853,739 B2 | 12/2020 | Truong | |
| 11,231,830 B2 | 1/2022 | Morris | |
| 2014/0358745 A1* | 12/2014 | Lunan | ..................... G06Q 40/12 |
| | | | 705/30 |

(Continued)

OTHER PUBLICATIONS

S.-C. Cha, H. Wang, Z. Tan, Y.-J. Joung, Y.-C. Tseng and K.-H. Yeh, "On Privacy Aware Carriers for Value-Possessed e-Invoices Considering Intelligence Mining," in IEEE Transactions on Emerging Topics in Computational Intelligence, vol. 4, No. 5, pp. 641-652, Oct. 2020. (Year: 2020).*

(Continued)

*Primary Examiner* — Anand Loharikar
(74) *Attorney, Agent, or Firm* — Lily Neff

(57) ABSTRACT

An embodiment for methods of processing invoices and purchase orders is provided. The embodiment may receive a set of invoices. The embodiment may cluster the set of invoices based on a series of invoice attributes. The embodiment may then utilize a multitask deep neural network model to split a generated cluster of invoices into subsets of invoices based on a series of invoice features. The embodiment may utilize a second deep neural network model to identify one or more prioritized subsets of invoices in the subsets of invoices that meet a purchase order match probability threshold. The embodiment may perform text mining on the one or more prioritized subsets of invoices to identify matching item-level services between individual invoices in the prioritized subset of invoices and a target purchase order. The embodiment may output matching invoices corresponding to the target purchase order.

14 Claims, 5 Drawing Sheets

(56) References Cited

U.S. PATENT DOCUMENTS

2022/0044111 A1    2/2022  Singh

OTHER PUBLICATIONS

Disclosed Anonymously, "System and Method of Automatic Generation of Syntactic and Semantic Glossary in Invoice Processing", IP.com, IPCOM000264852D, Jan. 31, 2021, 15 Pages. https://ip.com/IPCOM/00026485.

Disclosed Anonymously, "NLP Base Ontology Evolution with Continuous Reinforcement", IP.com, IPCOM000265466D, Apr. 13, 2021, 15 Pages. https://ip.com/IPCOM/00026546.

Disclosed Anonymously, "System and Method for Generatively Extracting Pertinent Structured Information from Documents using Contextual Information", IP.com, IPCOM000269025D, Mar. 16, 2022, 7 Pages. https://ip.com/IPCOM/00026902.

Gong, et al., "NeuronBlocks: Building Your NLP DNN Models Like Playing Lego", Association for Computational Linguistics, Proceedings of the 2019 EMNLP and the 9th IJCNL, Nov. 3-7, 2019, pp. 163-168.

Larsson, et al., "Automated invoice handling with machine learning and OCR", KTH Royal Institute of Technology School of Technology and Health, 2016, 68 Pages.

Maurya, et al., "Online Similarity Learning with Feedback for Invoice Line Item Matching", ARXIV, Feb. 14, 2020, 8 Pages. https://arxiv.org/abs/2001.00288.

Pal, "Improved Information Extraction with NLP & CRF for Invoices", International Journal of Science and Research (IJSR), vol. 8, Issue 3, Mar. 2019, pp. 1237 to 1239.

SUNY RF, "Two, Three, and Four Way Matching", RFSUNY.org, [Accessed on Sep. 8, 2022], 3 Pages. Retrieved from Internet: https://www.rfsuny.org/media/rfsuny/procedures/ap_2-3-4-way-matching_pro.htm.

* cited by examiner

100

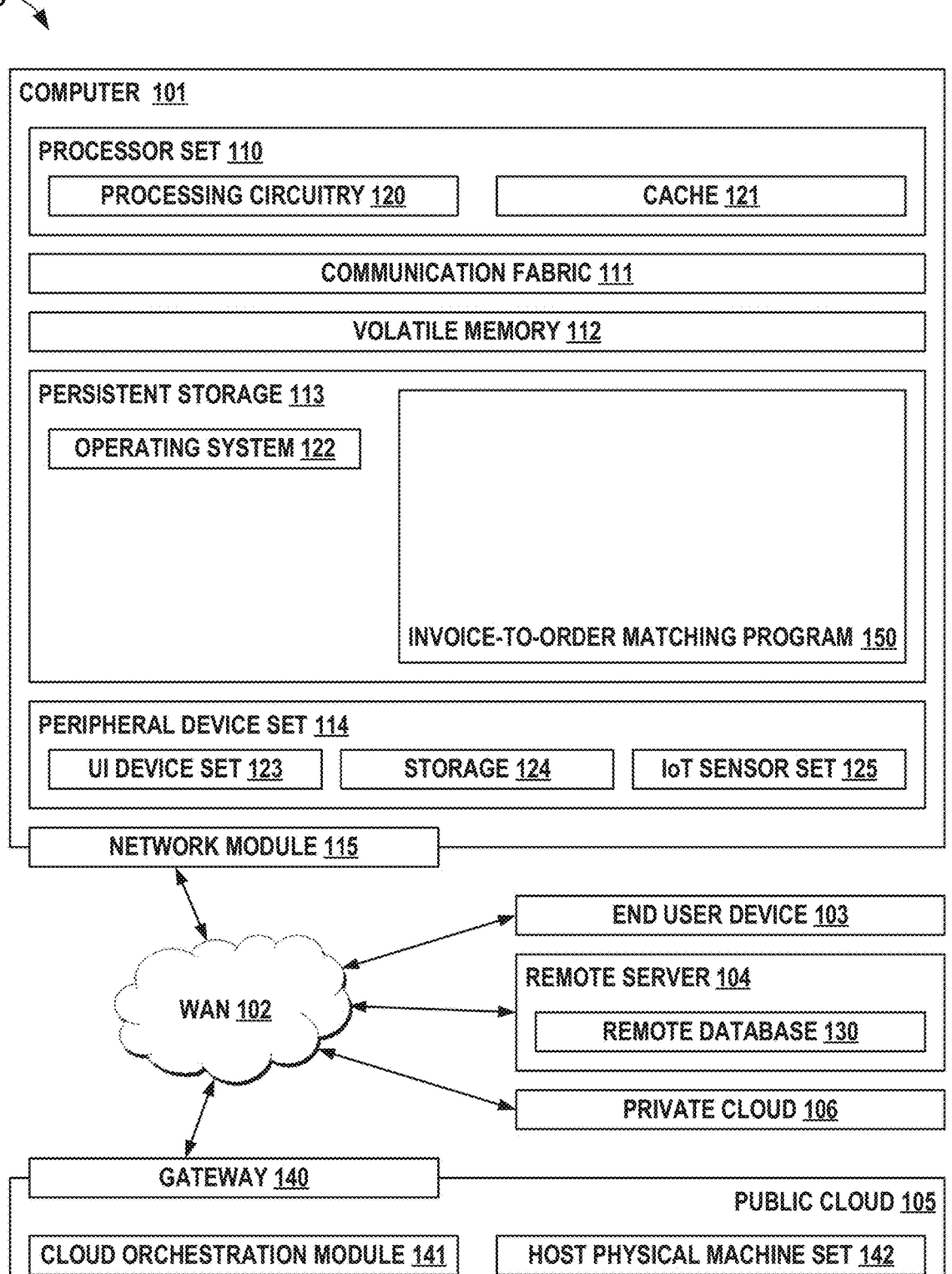

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

INVOICE-TO-ORDER MATCHING PROGRAM 150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

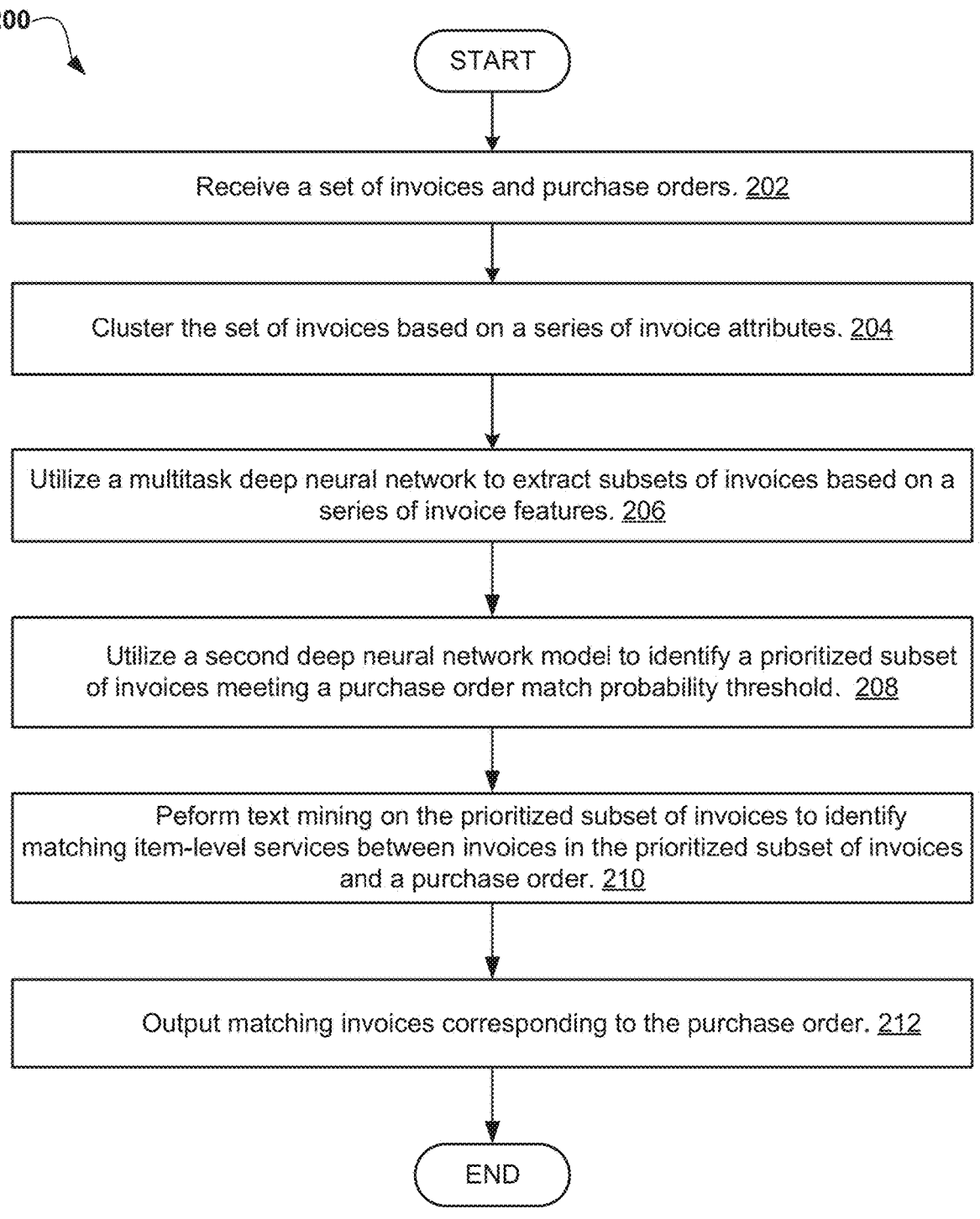

START

Receive a set of invoices and purchase orders. 202

Cluster the set of invoices based on a series of invoice attributes. 204

Utilize a multitask deep neural network to extract subsets of invoices based on a series of invoice features. 206

Utilize a second deep neural network model to identify a prioritized subset of invoices meeting a purchase order match probability threshold. 208

Peform text mining on the prioritized subset of invoices to identify matching item-level services between invoices in the prioritized subset of invoices and a purchase order. 210

Output matching invoices corresponding to the purchase order. 212

END

Figure 2

AUTOMATIC PROCESSING AND MATCHING OF INVOICES TO PURCHASE ORDERS

BACKGROUND

The present application relates generally to computer processing, and more particularly, to improved automatic matching of invoices to purchase orders.

Businesses purchase a wide variety of goods and services to function and operate. In the sales process, to document purchases and establish the rights and obligations of the parties as to the exact nature of the items desired and their respective quantities, prices, and other stipulations, a purchase order ("PO") is created by a buyer and is sent to a seller either electronically or on paper. The seller fills the order in accordance with the requirements of the PO and delivers the item to the buyer's designated location. Once received by the buyer an invoice reflecting the amount of currency due and payable in exchange for the items provided. The accounts payable ("A/P") department of the buyer compares the invoice to the original PO to ensure the purchase was properly authorized and to confirm that the terms on the invoice are consistent with those documented in the PO. Additionally, the invoice is parsed to extract the associated transportation or shipping charges, and any applicable sales taxes into its appropriate expense category for profit and loss ("P/L") posting. This process exists in some form in virtually all businesses and may involve a significant amount of information and data depending on whether the process is handled manually or in an automated fashion. Effective management and processing of invoice and purchase order data positively impacts the resource and monetary costs incurred by an accounts payable department of a given business.

SUMMARY

According to one embodiment, a method, computer system, and computer program product for matching invoices to purchase orders is provided. The embodiment may include receiving a set of invoices and purchase orders. The embodiment may also include clustering the set of invoices based on a series of invoice attributes. The embodiment may further include utilizing a multitask deep neural network model to split a generated cluster of invoices into subsets of invoices based on a series of invoice features. The embodiment may further include utilizing a second deep neural network model to identify one or more prioritized subsets of invoices in the subsets of invoices that meet a purchase order match probability threshold. The embodiment may also include performing text mining on the one or more prioritized subsets of invoices to identify matching item-level services between individual invoices in the prioritized subset of invoices and a target purchase order. The embodiment may further include outputting matching invoices corresponding to the target purchase order.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

FIG. 2 illustrates an operational flowchart for automatic processing and matching of invoices to purchase orders according to at least one embodiment;

DETAILED DESCRIPTION

Figure 3:
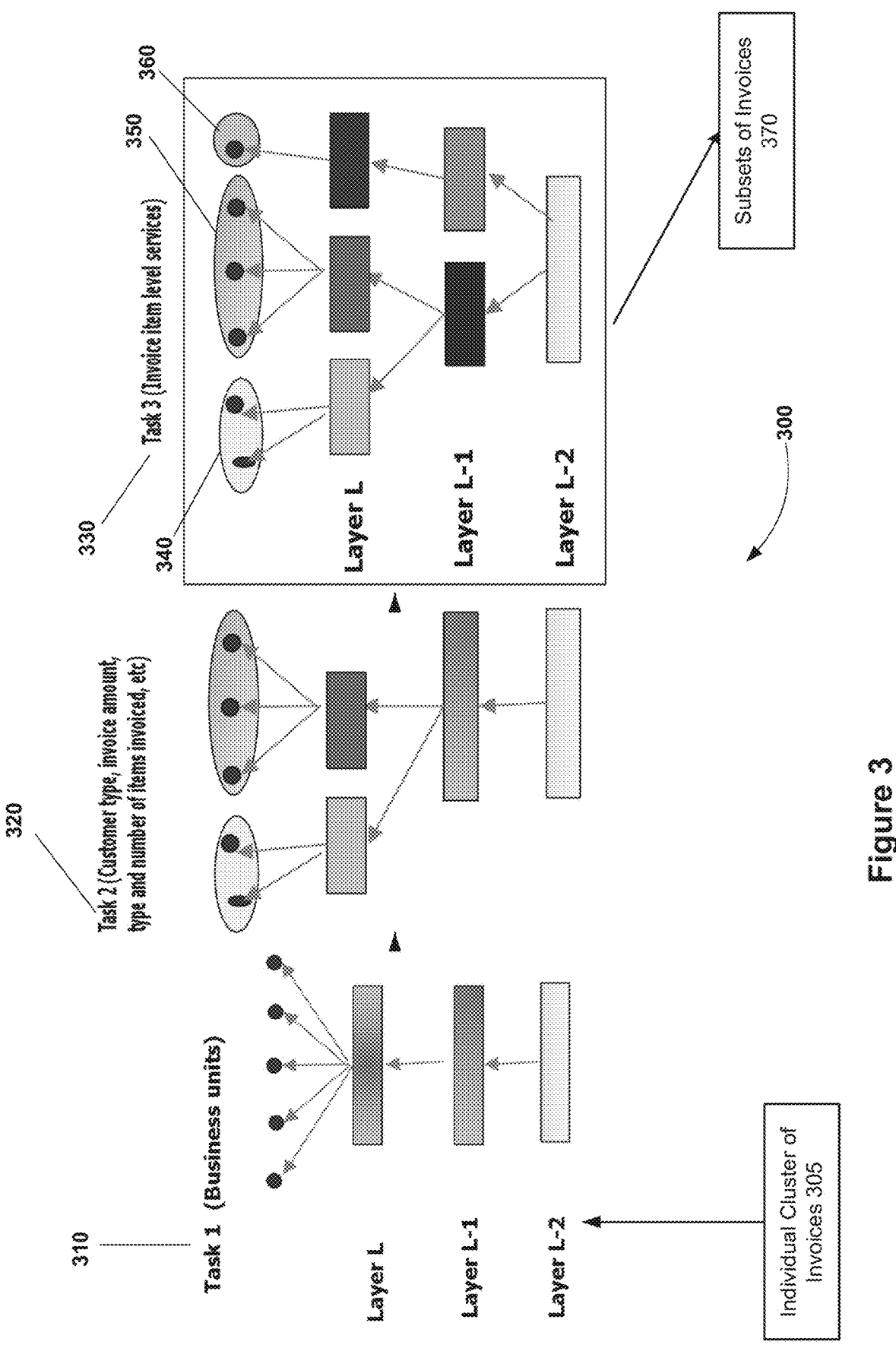
FIG. 3 illustrates an exemplary diagram illustrating a process of trimming a search space based on invoice features by utilizing a multitask deep neural network model according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computer processing, and more particularly, to improved automatic processing and matching of invoices to purchase orders. The following described exemplary embodiments provide a system, method, and program product to, among other things, receive a set of invoices and purchase orders, cluster the set of invoices based on a series of invoice attributes, utilize a multitask deep neural network model to split a generated cluster of invoices into subsets of invoices based on a series of invoice features, and utilize a second deep neural network model to identify one or more prioritized subsets of invoices in the subsets of invoices that meet a purchase order match probability threshold. The described exemplary embodiments may then perform text mining on the one or more prioritized subsets of invoices to identify matching item-level services between individual invoices in the prioritized subset of invoices and a target purchase order and output matching invoices corresponding to the target purchase order. Therefore, the presently described embodiments have the capacity to improve automatic matching of invoices to purchase orders by leveraging multitask deep neural network models and text mining using natural language processing systems to iteratively trim the amount of data and invoices being considered or searched, thereby making invoice-to-PO matching more efficient.

As previously described, businesses purchase a wide variety of goods and services to function and operate. In the procurement process, to document purchases and establish the rights and obligations of the parties as to the exact nature of the items desired and their respective quantities, prices, and other stipulations, a purchase order ("PO") is created by a buyer and is sent to a seller either electronically or on paper. The seller fills the order in accordance with the requirements of the PO and delivers the item to the buyer's designated location. Once received by the buyer an invoice reflecting the amount of currency due and payable in exchange for the items provided. The accounts payable ("A/P") department of the buyer compares the invoice to the original PO to ensure the purchase was properly authorized and to confirm that the terms on the invoice are consistent with those documented in the PO. Additionally, the invoice is parsed to extract the associated transportation or shipping charges, and any applicable sales taxes into its appropriate expense category for profit and loss ("P/L") posting. This process exists in some form in virtually all businesses and may involve a significant amount of information and data depending on whether the process is handled manually or in an automated fashion. Effective management and processing of invoice and purchase order data positively impacts the resource and monetary costs incurred by an accounts payable department of a given business.

There are several challenges for businesses seeking to effectively manage, process, and match invoices and purchase orders. For example, one challenge for businesses is managing the search space when matching invoices to purchase orders, as there can be millions of records for a single business unit. Accordingly, invoice-PO matching can be a complex, time consuming, and resource intensive task. Businesses with the appropriate capital and resources now employ software and automated systems to address invoice-PO matching. However, even with automated systems, the above-described challenges may remain when a business is faced with large volumes of invoices and purchase orders involving high-dimensionality data. In these types of environments, the task of extracting important and discriminative feature of PO's and invoices is non-trivial as the data is fast-changing and requires real time computation to have most up-to-date data. However, because search spaces can be unmanageably large and replete with high-dimensionality data, many automated systems still perform invoice-to-PO matching at slow and costly rates, as they are unable to limit the search space by trimming down the high volume of invoices being considered as matching to a given purchase order.

Accordingly, a method, computer system, and computer program product for improved matching of invoices to purchase orders would be advantageous. The method, system, and computer program product may receive a set of invoices and purchase orders. The method, system, computer program product may cluster the set of invoices based on a series of invoice attributes. The method, system, computer program product may then utilize a multitask deep neural network model to split a generated cluster of invoices into subsets of invoices based on a series of invoice features. Next, the method, system, computer program product may utilize a second deep neural network model to identify one or more prioritized subsets of invoices in the subsets of invoices that meet a purchase order match probability threshold. Then, the method, system, computer program product may perform text mining on the one or more prioritized subsets of invoices to identify matching item-level services between individual invoices in the prioritized subset of invoices and a target purchase order. Thereafter, the method, system, computer program product may output matching invoices corresponding to the target purchase order. In turn, the method, system, computer program product has provided improve methods of matching invoices to purchase orders by leveraging multitask deep neural network models and text mining using natural language processing systems to iteratively trim the amount of data and invoices being considered or searched, thereby making invoice-to-PO matching more efficient.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as invoice-to-order matching program/code 150. In addition to invoice-to-order matching code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and invoice-to-order matching code 150, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in invoice-to-order matching code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in invoice-to-order matching program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the invoice-to-order matching program 150 may be a program capable of receiving a set of invoices and purchase orders. Invoice-to-order matching program 150 may then cluster the set of invoices based on a series of invoice attributes. Next, invoice-to-order matching program 150 may utilize a multitask deep neural network model to split a generated cluster of invoices into subsets of invoices based on a series of invoice features. Then, invoice-to-order matching program 150 may utilize a second deep neural network model to identify one or more prioritized subsets of invoices in the subsets of invoices that meet a purchase order match probability threshold. Next, invoice-to-order matching program 150 may perform text mining on the one or more prioritized subsets of invoices to identify matching item-level services between individual invoices in the prioritized subset of invoices and a target purchase order. Thereafter, invoice-to-order matching program 150 may output matching invoices corresponding to the target purchase order. In turn, invoiceto-order matching program 150 has provided improved matching of invoices to purchase orders by leveraging multitask deep neural network models and text mining using natural language processing systems to iteratively trim the amount of data and invoices being considered or searched, thereby making invoice-to-PO matching more efficient.

Referring now to FIG. 2, an operational flowchart for a process 200 of matching invoices to purchase orders according to at least one embodiment is provided.

At 202, invoice-to-order matching program 150 may receive/process a set of invoices and purchase orders. Invoices and purchase orders (POs) may be continuously sent or 'fed' to invoice-to-order matching program 150 by any suitable means. For example, invoice-to-order matching program 150 may receive electronic data representing a given invoice or purchase order over a network that includes and/or forms part of an information delivery system, such as, Internet, the World Wide Web, and/or an analog or digital wireless telecommunications network. In embodiments, the received invoices and purchase orders may originate from databases or data warehouses. Invoice-to-order matching program 150 may store data associated with the received series of invoices in a database. In embodiments, invoice-to-order matching program 150 may utilize relational databases. In embodiments, invoice-to-order matching program 150 may be further configured to receive and store historical data that may be leveraged for learning data patterns and improved mapping of invoice and purchase order features and elements over time.

At 204, invoice-to-order matching program 150 may cluster the set of invoices based on a series of invoice attributes to generate clusters of invoices. Invoice-to-order matching program 150 may utilize any suitable clustering algorithm to generate the clusters. In embodiments, for example, invoice-to-order matching program 150 may leverage a K-means clustering algorithm to cluster data corresponding to the received sets of invoices by specific attributes which are user-defined, easily confused, and vary by invoice context. Exemplary invoice attributes (extracted from the invoice data received at 202) may include, for example, line of business, geography, customer type, country, brand, invoice ID, items invoiced, etc. In embodiments, for example, invoice-to-order matching program 150 may specify a number 'k' of clusters to be generated, randomly initialize 'k' centroids, and then repeat the process until it has assigned each invoice to its closest centroid.

Next, at 206, invoice-to-order matching program 150 may utilize a multitask deep neural network model (Multitask DNN) to split a generated cluster of invoices into subsets of invoices based on a series of invoice features. An exemplary Multitask DNN model for performing this step may be built on the datasets of invoices in each cluster generated at 204. Multi-task learning allows the Multitask DNN model to further trim down the searching space (for invoice to purchase order matching) by focusing on specific invoice features that are particularly impactful. In embodiments, feature importance may be quantified, for example, by the "number of occurrences" or qualified by "unique statements" from historical invoice data. In embodiments, exemplary features may include, for example, statement of country, brand or services offerings, etc. Under each task, there may be several feature layers for invoices. Certain features may be easier to learn from some tasks and some layers, while being difficult to learn from the original invoice dataset. The Multitask DNN learning may be utilized on the original invoice features, and then on the features defined from a trimmed or regrouped set of invoice data from previous tasks.

FIG. 3 depicts an exemplary diagram illustrating a process 300 of trimming a search space by utilizing a multitask deep neural network model according to at least one embodiment. In process 300, there are three dense network tasks which take, as inputs, invoice feature data from an individual generated cluster of invoices 305 to obtain multitask networks with loss functions. In embodiments, process 300 may involve starting with a thin network and using a greedy search method to dynamically widen it greedily during training using criterion that promote grouping of similar invoices. Next, while searching from bottom to up, each layer's relative weight may be adjusted in a cost function by deriving a multi-task loss function with task dependent uncertainty to quantify each model's performance. This will functionally trim the search space and output subsets of invoices. FIG. 3 depicts an example including a first Task 1 at 310 corresponds to the feature 'Business Units', a second Task 2 at 320 corresponding to 'Customer type, invoice amount, type of items invoiced, etc', and a third Task 3 at 330 corresponding to 'Invoice item level services', each task involving multiple Layers L, L-1, L-2, etc. Subsets of invoices will then be output at 340 for further consideration by invoice-to-order matching program 150. The generated task-dependent uncertainty functions for learning tasks to quantify each model performance may be stored as a reference for invoice to purchase order matching.

At 208, invoice-to-order matching program 150 may utilize a second deep neural network model to identify one or more prioritized subsets of invoices in the subsets of invoices that meet a purchase order match probability threshold. To accomplish this, invoice-to-order matching program 150 may utilize a second DNN to perform layer-by-layer feature mapping on the subsets of invoices output at step 206 to rank invoice features based on historical feature rankings. The second DNN may then be leveraged to identify invoices in the subsets of invoices having features matching most closely to the features of a target PO (received at step 202). PO features may include, for example, PO duration, status (whether active, draft, expired, etc.), PO line of business, billing frequency, etc. The DNN may utilize the task-dependent uncertainty function described (and stored as a reference) above in the first phase to determine match probabilities between each subset of invoices and the target PO. Invoice-to-order matching program 150 may assign and store the determined match probabilities for each of the subset of invoices. The assigned purchase order match probabilities may be numerically represented as numbers between 0 and 1, where 1 represents a certain match, and lower numbers represent unlikely match probabilities. This allows invoice-to-order matching program 150 to trim the search window even further by removing from consideration the subsets of invoices having an assigned match probability to the target PO that is below a given threshold. Invoice-to-order matching program 150 then identifies a prioritized set of invoices having an assigned match probability to the target PO that is above the given threshold. For example, invoice-to-order matching program 150 may trim or eliminate from consideration all invoices contained in subsets of invoices having a purchase order match probability value for an exemplary target PO that is below 0.9. Any remaining sets of invoices having a purchase order match probability value for the exemplary target PO above 0.9 may be identified by invoice-to-order matching program prioritized sets of invoices that may match the target PO. The predetermined purchase order match probability threshold may be changed or reconfigured by a user of the described embodiments.

Figure 4:
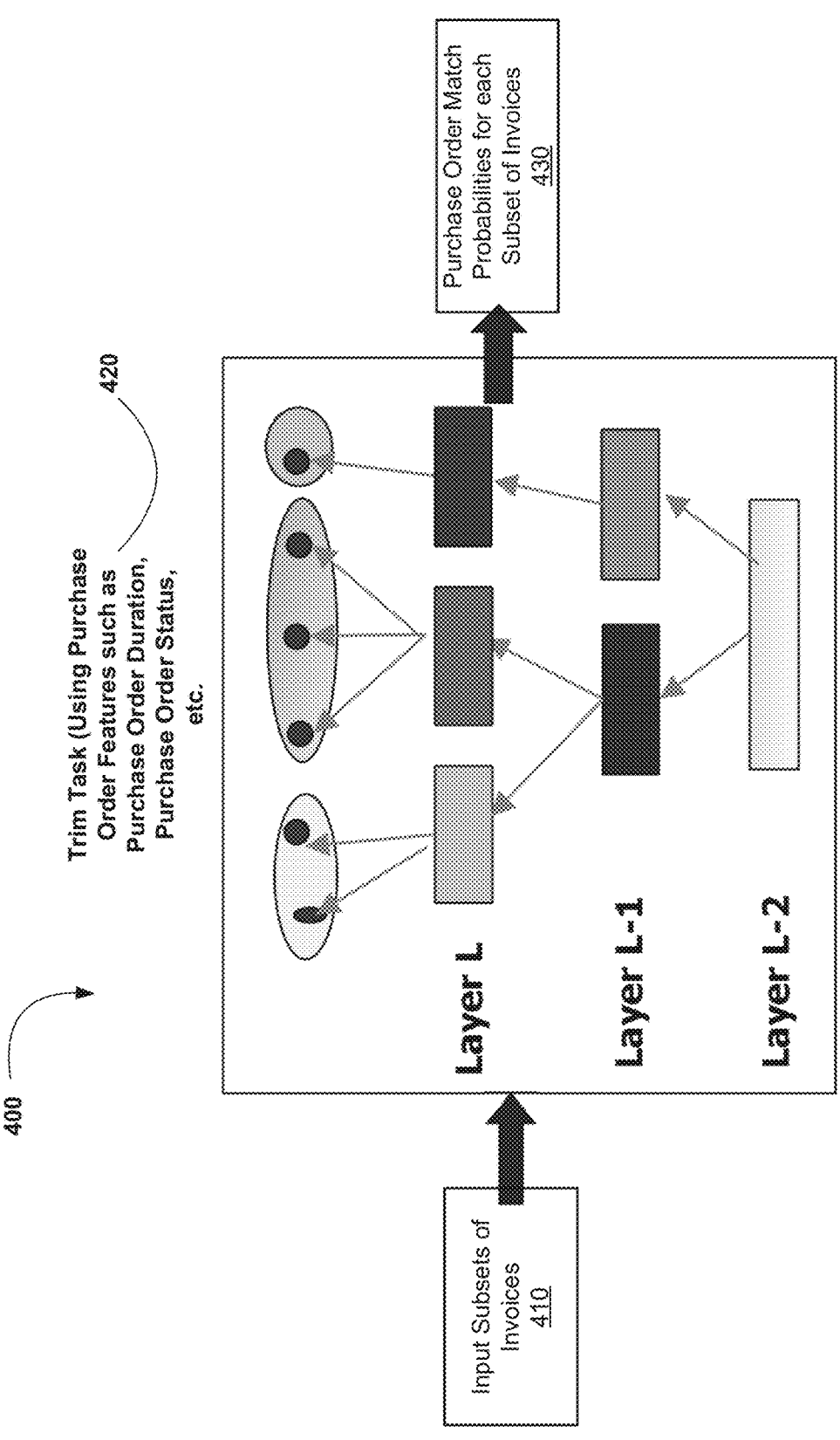
FIG. 4 illustrates an exemplary diagram illustrating a process of further trimming a search space based on purchase order features by utilizing a second deep neural network model according to at least one embodiment.

FIG. 4 depicts an exemplary process 400 for determining purchase order match probability for subset of invoices to identify a prioritized set of invoices as discussed above. In FIG. 4, the input includes subsets 410 of invoices. A trim task 420 is performed by utilizing an exemplary DNN to leverage target PO features such as, for example, duration of purchase order, purchase order status, etc. At 430, purchase order match probabilities for the target PO are output for each of the input subsets of invoices.

Next at 210, invoice-to-order matching program 150 may perform text mining on the one or more prioritized subsets of invoices to identify matching item-level services between individual invoices in the prioritized subset of invoices and a target purchase order. At this step, invoice-to-order matching program 150 may utilize natural language processing (NLP) tools to identify individual invoices in the prioritized subsets of invoices that match to a target purchase order by matching item-level service keywords that are in textual format contained in both the invoices and the target purchase order. In the context of this disclosure, 'item-level services' refer to varying services for items promised in a purchase order that may be billed for in a corresponding invoice. Exemplary item-level service keywords for matching may be related to various online web services, operating systems, server systems, or developer tools. Specific item-level service keywords may include, for example, 'Amazon Web Services®', 'MacOS®', 'Wireless Servers', 'JavaSDK', etc. (Amazon Web Services and all Amazon Web Services-based trademarks and logos are trademarks or registered trademarks of Amazon Technologies, Inc. and/or its affiliates, and MacOS and all MacOS-based trademarks and logos are trademarks or registered trademarks of Apple Inc. and/or its affiliates). Invoice-to-order matching program 150 may utilize an exemplary NLP model trained using ActionAPI (System-T). The exemplary NLP model may be written, for example, using Ariel Query Language (AQL) which is rule-based and can parse sentences into a form identifying the entity that performed a given action, to what entity it was performed, when it was performed, and why it was performed. Invoice-to-order matching program 150 may utilize an NLP model configured to extract entities with relationships as follows:

'Entity (keyword): data'

Some illustrative examples utilizing this method may be represented as follows:

"line description": "software development services"
"items sold": "servers"
"services": "mainframe servers"

Figure 5:
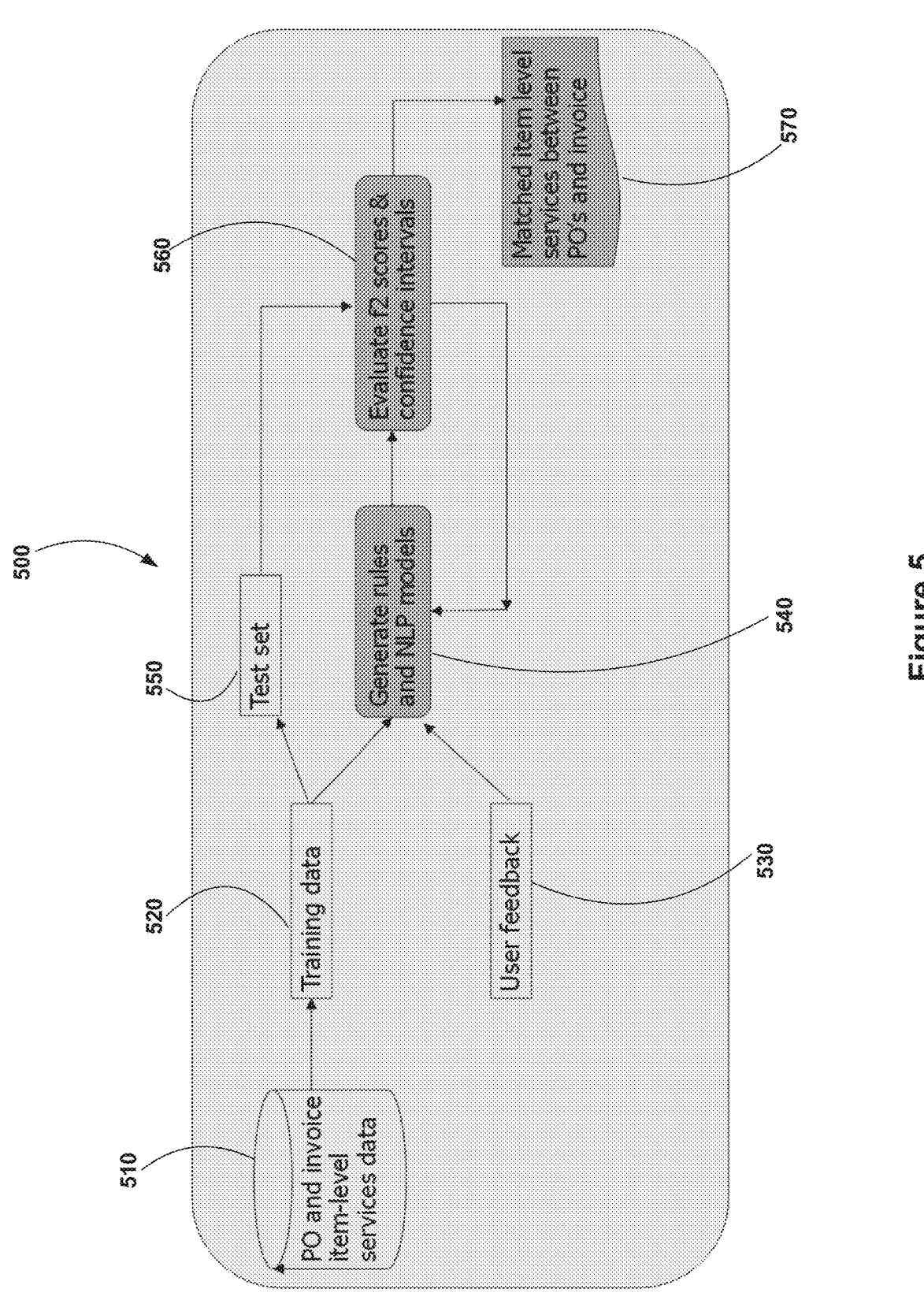
FIG. 5 depicts an exemplary framework for performing text mining on one or more prioritized set(s) of invoices and a target purchase order according to at least one embodiment.

FIG. 5 depicts an exemplary framework 500 for performing text mining as described above on a received set of invoices and a target purchase order according to at least one embodiment. The input for framework 500 may include PO and invoice item-level services data 510. This may be used to generate training data 520, which in combination with user feedback 530, may be used to generate rules and NLP models at 540. Training data 520 may also be used to generate test sets 550. At 560, f2 scores and confidence intervals may be employed as NLP tools determine matched item-level services between PO and invoices at 570.

At 212, having identified the individual invoices in the prioritized subset of invoices having item-level services matching the target purchase order, invoice-to-order matching program 150 may output the prioritized subsets of invoices as matching invoices corresponding to the target purchase order. Accordingly, there may be multiple invoices matching to the target purchase order contained in a given set of matching invoices. Invoice-to-order matching program 150 may output the matching invoices to a user using any suitable display or user interface that allows a user to easily visualize the matching invoices. For example, in embodiments invoice-to-order matching program 150 may output tabularized data in a convenient and user-friendly table highlighting identified matches.

It may be appreciated that invoice-to-order matching program 150 has thus provided improve methods of matching invoices to purchase orders by leveraging multitask deep neural network models and text mining using natural language processing systems to iteratively trim the amount of data and invoices being considered or searched, thereby making invoice-to-PO matching more efficient. The multitask DNN limits the search space by functionally identifying sub-clusters with high probabilities of matching a target purchase order based upon invoice and purchase order features, while the text mining leverages natural language processing tools to then isolate specific invoices in the identified sub-clusters that match with a target purchase order based upon item-level service matches in the individual invoices in the sub-clusters and the target purchase order. This provides highly accurate identified invoice-to-order matching that is both automated and effective. One of skill in the art will appreciate that when compared to conventional 2,3,4-way matching techniques for invoice-to-order matching, the described embodiments provide an improved method that automates the number of invoice features that can be used for matching at every step, based on numbers of layers. The presently described embodiments also provide a comparatively faster method by utilizing multitask learning DNNs and by applying parallelization computation for the clusters of invoices to reduce the required processing time. The described embodiments provide a fully automated method for invoice-to-order matching that is advantageous in environments involving high-dimensionality data in which the task of extracting important and discriminative features of PO and invoice is non-trivial as the data is fast changing and requires real-time computation to have the most up-to-date data.

It may be appreciated that FIG. 2 provides only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-based method of processing invoices and purchase orders, the method comprising:

receiving a set of invoices and purchase orders;

clustering the set of invoices based on a series of invoice attributes;

utilizing a multitask deep neural network model to split a generated cluster of invoices into subsets of invoices based on a series of invoice features;

utilizing a second deep neural network model to identify one or more prioritized subsets of invoices in the subsets of invoices that meet a purchase order match probability threshold;

employing a default function to rank a feature importance of invoices using performance on historical invoices set, wherein utilizing a multitask deep neural network model to split a generated cluster of invoices into subsets of invoices based on a series of invoice features;

generating task-dependent uncertainty functions for learning tasks to quantify performance values for each model;

performing text mining on the one or more prioritized subsets of invoices to identify matching item-level services between individual invoices in the prioritized subset of invoices and a target purchase order; and outputting matching invoices corresponding to the target purchase order.

2. The computer-based method of claim 1, wherein the generated task-dependent uncertainty functions are stored as references for future invoice to purchase order matching.

3. The computer-based method of claim 1, wherein utilizing a second deep neural network model to identify one or more prioritized subsets of invoices in the subsets of invoices that meet a purchase order match probability threshold further comprises:

performing layer-by-layer feature mapping and ranking a series of features based on historical feature importance rankings.

4. The computer-based method of claim 2, further comprising:

utilizing the stored task-dependent uncertainty function to determine and assign purchase order match probabilities to the identified subsets of invoices for the target purchase order.

5. The computer-based method of claim 1, wherein performing text mining on the one or more prioritized subsets of invoices to identify matching item-level services between individual invoices in the prioritized subset of invoices and a target purchase order further comprises:

utilizing a natural language processing model that is written using ariel query language (AQL).

6. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising: A computer-based method of processing invoices and purchase orders, the method comprising:

receiving a set of invoices and purchase orders;

clustering the set of invoices based on a series of invoice attributes;

utilizing a multitask deep neural network model to split a generated cluster of invoices into subsets of invoices based on a series of invoice features;

utilizing a second deep neural network model to identify one or more prioritized subsets of invoices in the subsets of invoices that meet a purchase order match probability threshold;

employing a default function to rank a feature importance of invoices using performance on historical invoices set, wherein utilizing a multitask deep neural network model to split a generated cluster of invoices into subsets of invoices based on a series of invoice features;

generating task-dependent uncertainty functions for learning tasks to quantify performance values for each model;

performing text mining on the one or more prioritized subsets of invoices to identify matching item-level services between individual invoices in the prioritized subset of invoices and a target purchase order; and outputting matching invoices corresponding to the target purchase order.

7. The computer system of claim 6, wherein the generated task-dependent uncertainty functions are stored as references for future invoice to purchase order matching.

8. The computer system of claim 6, wherein utilizing a second deep neural network model to identify one or more prioritized subsets of invoices in the subsets of invoices that meet a purchase order match probability threshold further comprises:

performing layer-by-layer feature mapping and ranking a series of features based on historical feature importance rankings.

9. The computer system of claim 7, further comprising:

utilizing the stored task-dependent uncertainty function to determine and assign purchase order match probabilities to the identified subsets of invoices for the target purchase order.

10. The computer system of claim 6, wherein performing text mining on the one or more prioritized subsets of invoices to identify matching item-level services between individual invoices in the prioritized subset of invoices and a target purchase order further comprises: utilizing a natural language processing model that is written using ariel query language (AQL).

11. A computer program product, the computer program product comprising:

one or more computer-readable tangible storage medium and program instructions stored on at least one of the one or more computer-readable tangible storage medium, the program instructions executable by a processor capable of performing a method, the method comprising: A computer-based method of processing invoices and purchase orders, the method comprising:

receiving a set of invoices and purchase orders;

clustering the set of invoices based on a series of invoice attributes;

utilizing a multitask deep neural network model to split a generated cluster of invoices into subsets of invoices based on a series of invoice features;

utilizing a second deep neural network model to identify one or more prioritized subsets of invoices in the subsets of invoices that meet a purchase order match probability threshold;

employing a default function to rank a feature importance of invoices using performance on historical invoices set, wherein utilizing a multitask deep neural network model to split a generated cluster of invoices into subsets of invoices based on a series of invoice features;

generating task-dependent uncertainty functions for learning tasks to quantify performance values for each model;

performing text mining on the one or more prioritized subsets of invoices to identify matching item-level services between individual invoices in the prioritized subset of invoices and a target purchase order; and outputting matching invoices corresponding to the target purchase order.

12. The computer program product of claim 11, wherein the generated task-dependent uncertainty functions are stored as references for future invoice to purchase order matching.

13. The computer program product of claim 11, wherein utilizing a second deep neural network model to identify one or more prioritized subsets of invoices in the subsets of invoices that meet a purchase order match probability threshold further comprises:

performing layer-by-layer feature mapping and ranking a series of features based on historical feature importance rankings.

14. The computer program product of claim 11, wherein performing text mining on the one or more prioritized subsets of invoices to identify matching item-level services between individual invoices in the prioritized subset of invoices and a target purchase order further comprises:

utilizing a natural language processing model that is written using ariel query language (AQL).

* * * * *